US011924198B2

(12) United States Patent
McGrandle et al.

(10) Patent No.: US 11,924,198 B2
(45) Date of Patent: Mar. 5, 2024

(54) BEHAVIORAL ONE-TIME-PASSCODE (OTP) GENERATION

(71) Applicant: MASTERCARD TECHNOLOGIES CANADA ULC, Vancouver (CA)

(72) Inventors: Jonathan McGrandle, Vancouver (CA); Man Fung Lee, Vancouver (CA); Kyle Williams, Wentzville, MO (US)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 345 days.

(21) Appl. No.: 17/241,911

(22) Filed: Apr. 27, 2021

(65) Prior Publication Data

US 2022/0345454 A1    Oct. 27, 2022

(51) Int. Cl.
*H04L 29/06* (2006.01)
*H04L 9/40* (2022.01)

(52) U.S. Cl.
CPC ...... *H04L 63/0838* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 10,389,707 | B2* | 8/2019 | Grunin | H04L 63/0838 |
| 10,405,186 | B1* | 9/2019 | Latsha | H04W 8/183 |
| 11,552,953 | B1* | 1/2023 | Avadhanam | H04L 63/102 |
| 2007/0250920 | A1* | 10/2007 | Lindsay | G06F 21/31 726/7 |
| 2014/0115341 | A1* | 4/2014 | Robertson | G06F 21/30 713/183 |
| 2015/0347765 | A1* | 12/2015 | Hankins, Jr. | H04L 63/20 726/26 |
| 2016/0294837 | A1* | 10/2016 | Turgeman | G06F 21/316 |
| 2017/0169211 | A1* | 6/2017 | Gao | H04L 63/083 |
| 2017/0302658 | A1* | 10/2017 | Lee | H04L 63/067 |
| 2018/0349583 | A1* | 12/2018 | Turgeman | H04L 63/0861 |

(Continued)

FOREIGN PATENT DOCUMENTS

| | | | | |
|---|---|---|---|---|
| EP | 2947618 | A1 * | 11/2015 | G06Q 20/10 |
| TW | 201702960 | | * 11/2017 | |

OTHER PUBLICATIONS

Balasegu, "One Stop for Testing and Tools", found on Balasegu.weebly.com/otp.html, Apr. 20, 2016 (Year: 2016).*

(Continued)

*Primary Examiner* — Piotr Poltorak
(74) *Attorney, Agent, or Firm* — Michael Best & Friedrich LLP

(57) ABSTRACT

Devices, systems, and methods with behavioral one-time-passcode (OTP) generation. In one example, a server includes a memory and an electronic processor communicatively connected to the memory. The memory includes a behavioral one-time-passcode (OTP) program and a user profile repository. The electronic processor, when executing the behavioral OTP program, is configured to receive a one-time-passcode (OTP) request, generate a behavioral one-time-passcode (OTP) based on a user profile stored in the user profile repository in response to receiving the OTP request, and output the behavioral OTP that is generated.

14 Claims, 7 Drawing Sheets

(56) References Cited

U.S. PATENT DOCUMENTS

2018/0375854 A1   12/2018  Baca et al.
2019/0372967 A1*  12/2019  Cho ..................... H04L 9/3228
2022/0188400 A1*   6/2022  Nassar ................... G06F 21/46

OTHER PUBLICATIONS

Dan Miller, "A New Authentication Paradigm: Call Center Security without Comprising Customer Experience", opsresearch, found at https://www.verint.com/Assets/resources/resource-types/white-papers/opus-research-new-authentication-paradigm.pdf. (Year: 2013 ).*
Tiffany Mark, "How to comply with PSD2 authenticaiotn without a headache", found at https://securityboulevard.com/2021/09/how-to-comply-with-psd2-authentication-without-a-headache/ (Year: 2021).*
International Search Report and Written Opinion for Application No. PCT/CA2022/050615 dated Jul. 27, 2022 (8 pages).

* cited by examiner

| OTP Code Pattern | User Interaction Data |
|---|---|
| **3 | UID1 |
| **9 | UID2, UID3 |
| *7* | UID1, UID2, UID3 |
| *73 | UID1 |
| *79 | UID2, UID3 |
| 2** | UID3 |
| 2*9 | UID3 |
| 27* | UID3 |
| 279 | UID3 |
| 6** | UID1, UID2 |
| 6*3 | UID1 |
| 6*9 | UID2 |
| 67* | UID1, UID2 |
| 673 | UID1 |
| 679 | UID2 |

FIG. 5

| OTP Code Pattern | User Interaction Data |
| --- | --- |
| **3 | UID1, UID4 |
| **9 | UID2, UID3 |
| *7* | UID1, UID2, UID3, UID4 |
| *73 | UID1, UID4 |
| *79 | UID2, UID3 |
| 2** | UID3, UID4 |
| 2*9 | UID3 |
| 27* | UID3, UID4 |
| 273 | UID4 |
| 279 | UID3 |
| 6** | UID1, UID2 |
| 6*3 | UID1 |
| 6*9 | UID2 |
| 67* | UID1, UID2 |
| 673 | UID1 |
| 679 | UID2 |

BEHAVIORAL ONE-TIME-PASSCODE (OTP) GENERATION

FIELD

The present disclosure relates generally to one-time-passcodes (OTPs). More specifically, the present disclosure relates to behavioral one-time-passcode (OTP) generation.

BACKGROUND

Conventionally, behavioral biometrics have been used to authenticate a user based on the way the user interacts with an application. Most commonly, these behavioral biometrics are applied in username/password login applications where the user subconsciously enters credentials in a uniquely identifiable manner.

To authenticate a user using behavioral biometrics, historic interactions must have been observed. This allows a "user profile" to be generated for the user, where trends in the "user profile" may be identified. The trends may include: 1) how the user typically types, which keys the user finds most comfortable, how the user holds the device, and how the user navigates the fields on the page.

These trends are most accurately identified when a common baseline is present in the interactions. A long application on a webpage may elicit different interactions from a user than a familiar login form that the user has previously used. Further, these trends are most accurate and easily identified when the user enters the same information.

Another form of authentication is one-time-passcodes (OTPs), which offer a single factor of multi-factor authentication. In an OTP authentication, an application sends the user an OTP and the user provides the OTP that was sent from the application. Conventional OTPs are typically six to twelve digits, and unlike a standard password, conventional OTPs are random and dynamically generated to ensure the OTPs are different for each user interaction with the application.

SUMMARY

The randomness and dynamic generation of conventional OTPs prevents fraudulent users from capturing an OTP and using the captured OTP in the future. However, the randomness and dynamic generation of conventional OTPs also makes capturing behavioral trends among entries of OTPs, very difficult, if not impossible, because the random nature of a conventional OTP prevents a "baseline" from being developed on which a passive biometric profile for the user may be formed.

The present disclosure overcomes the above-noted problem with respect to conventional OTPs by removing some of the randomness in the OTP to capture behavioral trends among the OTPs while still ensuring that the OTPs are still different for each user interaction with an application. Specifically, this is overcome by generating OTPs that allow for the capture of behavioral trends of a particular user (hereinafter referred to as a "behavioral OTP"). Put simply, the behavioral OTP of the present disclosure is semi-random (or initially random) and provides a baseline on which a passive biometric profile for the user may be formed.

In view of the foregoing, conventional OTPs may be used as part of a multi-factor authentication, but cannot be used to perform a passive biometric analysis that identifies a user because the conventional OTPs are random and dynamically generated. The behavioral OTP of the present disclosure is an improvement over the conventional OTPs because the behavioral OTP of the present disclosure may be used as part of a multi-factor authentication and to perform a passive biometric analysis that confirms a passive biometric match of a user. Additionally, the behavioral OTP of the present disclosure is an improvement over the conventional OTPs because the behavioral OTP provides a baseline that may be leveraged in a passive biometric analysis, thereby providing a second factor of authentication based solely on OTP entry. In fact, once the baseline with the behavioral OTP is established, the behavioral OTP may, by itself, be multi-factor authentication, i.e., include two distinct authentication factors.

In one embodiment, the present disclosure includes a server. The server includes a memory and an electronic processor communicatively connected to the memory. The memory includes a behavioral one-time-passcode (OTP) program and a user profile repository. The electronic processor, when executing the behavioral OTP program, is configured to receive a one-time-passcode (OTP) request, generate a behavioral one-time-passcode (OTP) based on a user profile stored in the user profile repository in response to receiving the OTP request, and output the behavioral OTP that is generated.

In another embodiment, the present disclosure includes a system. The system includes a network, an interface device, and a server. The server including a memory and an electronic processor communicatively connected to the memory. The memory including a behavioral one-time-passcode (OTP) program and a user profile repository. The electronic processor, when executing the behavioral OTP program, is configured to receive a one-time-passcode (OTP) request from the interface device via the network, generate a behavioral one-time-passcode (OTP) based on a user profile stored in the user profile repository in response to receiving the OTP request, and output the behavioral OTP that is generated to the interface device via the network.

In yet another embodiment, the present disclosure includes a method. The method includes receiving, with an electronic processor, a one-time-passcode (OTP) request via a communication interface. The method includes generating, with the electronic processor, a behavioral one-time-passcode (OTP) based on a user profile stored in a memory in response to receiving the OTP request. The method includes controlling, with the electronic processor, the communication interface to output the behavioral OTP that is generated.

BRIEF DESCRIPTION OF THE DRAWINGS

FIGS. 3-6 are tables illustrating example stages of a pattern table that is built by the system of FIG. 1, in accordance with various aspects of the present disclosure.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
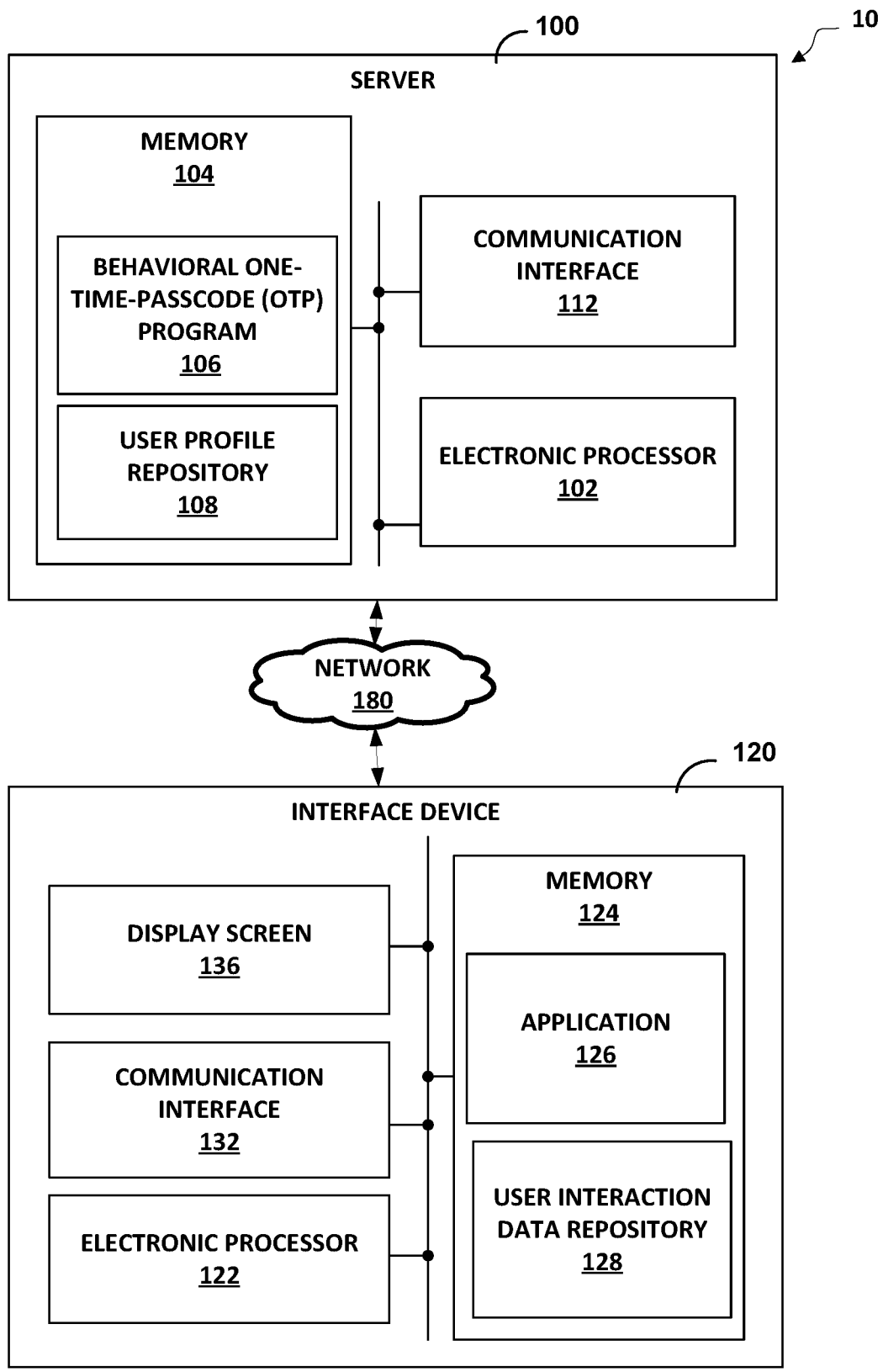
FIG. 1 is a block diagram illustrating a system including behavioral one-time-passcode (OTP) generation, in accordance with various aspects of the present disclosure.

FIG. 1 is a block diagram illustrating a system 10 including behavioral one-time-passcode (OTP) generation, in accordance with various aspects of the present disclosure. It should be understood that, in some embodiments, there are different configurations from the configuration illustrated in FIG. 1. The functionality described herein may be extended to any number of servers providing distributed processing.

In the example of FIG. 1, the system 10 includes a server 100, an interface device 120, and a network 180. The server 100 includes an electronic processor 102 (for example, a microprocessor or another suitable processing device), a memory 104 (for example, a non-transitory computer-readable medium or a non-transitory computer-readable storage medium), and a communication interface 112. It should be understood that, in some embodiments, the server 100 may include fewer or additional components in configurations different from that illustrated in FIG. 1. Also the server 100 may perform additional functionality than the functionality described herein. In addition, the functionality of the server 100 may be incorporated into other servers. As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding a behavioral one-time-passcode (OTP) program 106. In some examples, the data storage area may store data regarding a user profile repository 108.

The behavioral OTP program 106 causes the electronic processor 102 to control the communication interface 112 to receive a login request from the interface device 120. In response to receiving the login request, the behavioral OTP program 106 causes the electronic processor 102 to generate behavioral one-time-passcodes (OTPs) and control the communication interface 112 to transmit the behavioral OTPs that are generated to the interface device 120. In some examples, the generation of the behavioral OTPs is a generation of different OTP patterns based on a non-random OTP code. Specifically, given a non-random two digit OTP code "12," the different OTP patterns include: 12, 1*, and *2, where * represents a wild card that may be replaced by any character.

However, the different OTP patterns are not limited to a non-random two digit OTP code with a single wildcard. Instead, the different OTP patterns may include more than two non-random digits and any number of wild cards. Put simply, the different OTP patterns have a non-random portion and a random portion.

The behavioral OTP program 106 also causes the electronic processor 102 to collect or update the behavioral trends stored in each user profile of the user profile repository 108. The user profile repository 108 is a central repository of different user profiles. Each user profile is associated with a specific user. Each user profile may also include user interaction data associated with the specific user and a pattern table based on the user interaction data associated with the specific user.

The pattern table is a user specific mapping from the different OTP patterns to a set of user interaction data from previous OTP submissions by the specific user. The behavioral OTP program 106 also causes the electronic processor 102 to generate the pattern table after the specific user submits several OTP submissions.

The user interaction data includes behavioral data observed as the specific user enters the several OTP submissions. The user interaction data may be observed locally by the server 100 hosting a webpage or may receive remote user interaction data from the interface device 120. The remote user interaction data is user interaction data observed by the interface device 120.

The user interaction data and/or the remote user interaction data may include: 1) the overall time it takes the user to enter the OTP, 2) the amount of time between digit entries, 3) the pressure applied to the display screen 136 during the entry of each digit, 4) the angle of the interface device 120 during the entry of each digit, 5) the digit entered incorrectly or accidentally (e.g., the first digit expected may be a 6, however the user may accidentally enter an 8), 6) the number of times the user corrected the OTP entry, 7) the way the page was submitted after the OTP was entered (e.g., did the user click a button or did the user hit the 'Enter/Return' key), 8) other suitable user interaction data, and 9) a combination thereof.

After a pattern table is generated for the specific user, the behavioral OTP program 106 causes the electronic processor 102 to retrieve the pattern table associated with the specific user of the interface device 120 from the user profile repository 108 and generates the OTP pattern based on the pattern that is retrieved. Upon receiving the OTP submission of the OTP pattern, the behavioral OTP program 106 causes the electronic processor 102 to perform a passive biometric analysis of the OTP submission to determine whether the user of the interface device 120 is the specific user that previously submitted OTP submissions.

The communication interface 112 receives data from and provides data to devices external to the server 100, such as the interface device 120. For example, the communication interface 112 may include a port or connection for receiving a wired connection (for example, an Ethernet cable, fiber optic cable, a telephone cable, or the like), a wireless transceiver, or a combination thereof. In some examples, the network 180 is the Internet. In some examples, the communication interface 112 transmits the behavioral OTP to the interface device 120 as an email message or an SMS message via the network 180.

In the example of FIG. 1, the interface device 120 (also referred to herein as "an electronic device" or "a display device") includes an electronic processor 122 (for example, a microprocessor or another suitable processing device), a memory 124 (for example, a non-transitory computer-readable storage medium), a communication interface 132, and a display screen 136. It should be understood that, in some embodiments, the interface device 120 may include fewer or additional components in configurations different from that illustrated in FIG. 1. Also the interface device 120 may perform additional functionality than the functionality described herein. In addition, some of the functionality of the interface device 120 may be incorporated into other servers (e.g., incorporated into the server 100). As illustrated in FIG. 1, the electronic processor 122, the memory 124, the communication interface 132, and the display screen 136 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes an application 126. In some examples, the application 126 may be a standalone application. In other examples, the application 126 is a feature that is part of a separate application (e.g., the application 126 may be included as part of a camera application, a banking application, or other suitable application). The data storage area includes a user interaction data repository 128.

The application 126 causes the electronic processor 122 to control the communication interface 132 to transmit a login request to the server 100 via the network 180. In response to transmitting the login request, the application 126 causes the electronic processor 122 to control the communication interface 132 to receive an OTP from the server 100 in response to transmitting the login request.

In some examples, the application 126 also causes the electronic processor 122 to observe a user of the interface device 120 submitting the OTP to the server 100 in response to receiving the OTP from the server 100. In these examples, the application 126 causes the electronic processor 122 to store observations of the user in the user interaction data repository 128 while the user of the interface device 120 submits the OTP to the server 100. After recording the observations of the user, the application 126 causes the electronic processor 122 to upload the observations of the user stored in the user interaction data repository 128 to the server 100 via the network 180.

In some examples, the interface device 120 is a smartphone and the display screen 136 is a presence-sensitive display screen. In these examples, the interface device 120 includes one or more user interfaces (not shown). The one or more user interfaces include one or more input mechanisms (for example, a touch screen, a keypad, a button, a knob, a mouse, and the like), one or more output mechanisms (for example, a display, a printer, a speaker, and the like), or a combination thereof.

The communication interface 132 receives data from and provides data to devices external to the interface device 120, i.e., the server 100. For example, the communication interface 132 may include a port or connection for receiving a wired connection (for example, an Ethernet cable, fiber optic cable, a telephone cable, or the like), a wireless transceiver, or a combination thereof. In some examples, the communication interface 132 may be communicatively connected to the communication interface 112 via a backhaul (not shown).

The display screen 136 is an array of pixels that generates and outputs images including augmented reality images to a user. The augmented reality images are images including a camera image and a graphical user interface overlaid on the camera image. In some examples, the display screen 136 is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The electronic processor 122 controls the display screen 136 to display the login webpage when executing the application 126.

Figure 2:
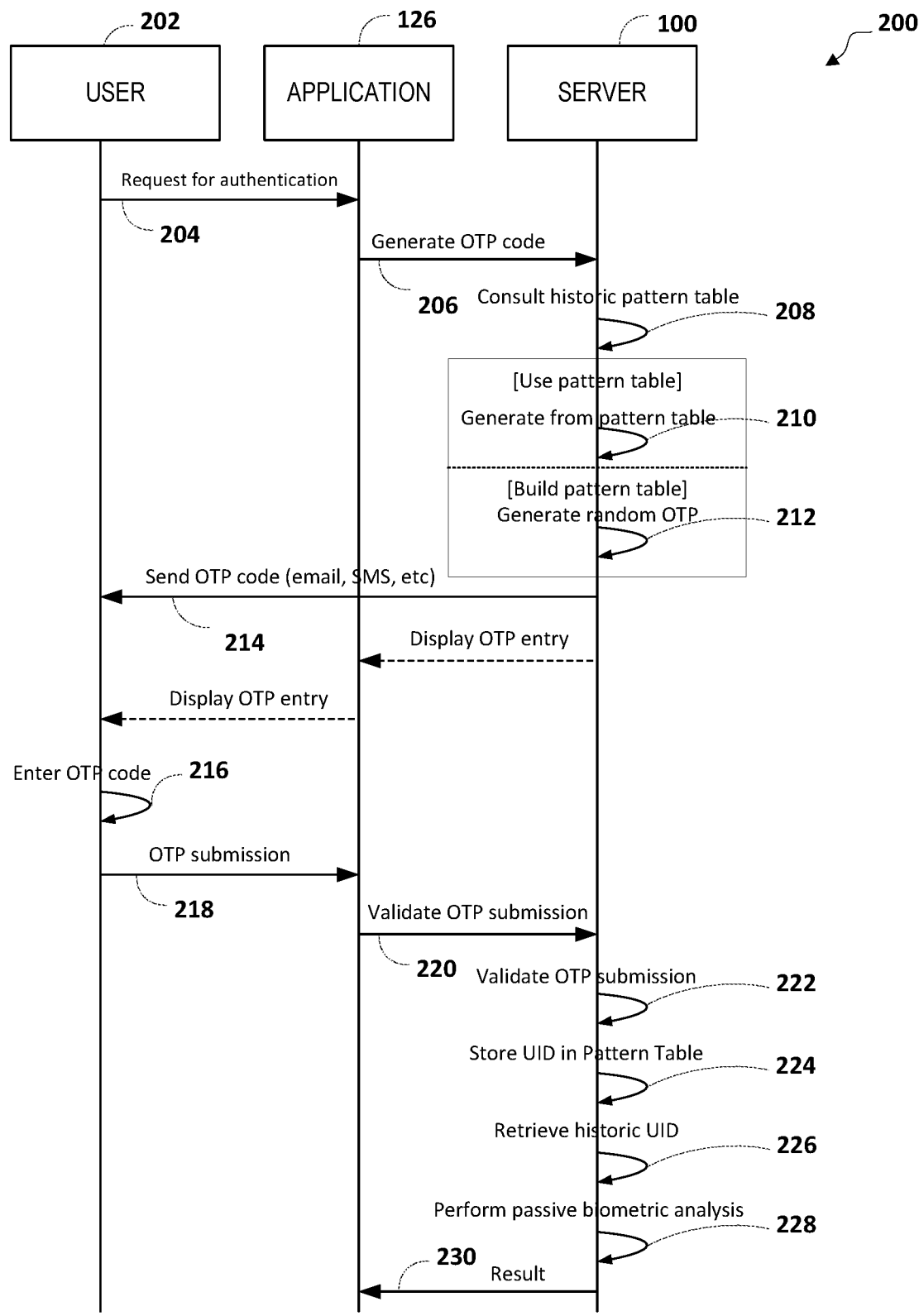
FIG. 2 is a flow diagram illustrating a passive biometric analysis of a user with the system of FIG. 1, in accordance with various aspects of the present disclosure.

FIG. 2 is a flow diagram illustrating a passive biometric analysis of a user 202 with the system 10 of FIG. 1, in accordance with various aspects of the present disclosure. In the example of FIG. 2, the user 202 requests authentication in the application 126 (at operation 204). The request by the user 202 may be a "Login" request or may be a request derived from an attempt by the user 202 to access a restricted portion of the application 126.

In response to the authentication request by the user 202, the application 126 requests an OTP from the server 100 (at operation 206). Specifically, the application 126 sends a generate OTP code request along with a user identifier (e.g., an identifier of a user or an identifier of a user account) to the server 100.

In response to the OTP request by the application 126, the server 100 attempts to consult a historic pattern table in a user profile of the user profile repository 108 that is associated with the user 202 (at operation 208). Specifically, the server 100 looks up and consults the historic pattern table using the identifier sent by the application 126. The historic pattern table is a map of user accounts and/or user identifiers.

In response to consulting the historic pattern table that is associated with the user 202, the server 100 generates a behavioral OTP (i.e., a semi-random OTP) based on the historic pattern table as explained above (at operation 210). In response to being unable to consult a historic pattern table that is associated with the user 202, the server 100 starts the process of building a pattern table that is associated with the user 202 by generating a behavioral OTP (i.e., a random OTP or a semi-random OTP based on a default pattern table) (at operation 212).

As illustrated in FIG. 2, the server 100 sends the behavioral OTP (i.e., the semi-random OTP, the random OTP, or the second semi-random OTP) to the user 202 with a request that the user 202 enter the behavioral OTP into the application 126 via an electronic communication (e.g., email or SMS) or other suitable delivery mechanism (e.g., a display screen) (at operation 214). For example, the server 100 provides the OTP to the application 126 and the application 126 displays the OTP to the user 202 with the display screen 136.

Additionally, as illustrated in FIG. 2, the user 202 enters the OTP that is generated and sent by the server 100 into an entry screen of the application 126 (at operation 216). While the user 202 enters the OTP, the application 126 also observes the OTP submission by the user 202 and stores the observations of the user 202 in the user interaction data repository 128 (at operation 218). After observing the OTP submission by the user 202, the application 126 forwards the OTP submission and the observations of the user 202 to the server 100 (at operation 220).

As illustrated in FIG. 2, the server 100 validates the OTP submission by the user 202 against the behavioral OTP (at operation 222). Additionally, the server 100 stores the observations of the user 202 in a pattern table of the user profile that is associated with the user 202 (at operation 224).

As illustrated in FIG. 2, after storing the observations of the user 202 in the pattern table, the server 100 retrieves the pattern table of the user profile that is associated with the user 202 (at operation 226). The server 100 then performs a passive biometric analysis of the user 202 based on the pattern table that is retrieved (at operation 228). For example, the passive biometric analysis may include analyzing user error rate compared to historic user error rates, analyzing words-per-minute compared to historic words-per-minute, analyzing key up and/or key down times compared to historic key up and/or key down times, or any other suitable passive biometric analysis. In performing the passive biometric analysis of the user 202, the server 100 determines whether the user 202 is the same as a previous user that entered a previous behavioral OTP and outputs the determination as part of a result to the application 126 (at operation 230).

The result to the application 126 indicates whether the OTP submission was successfully validated. The result to the application 126 also indicates one of three outcomes of the passive biometric analysis. In one outcome, the result indicates that the passive biometric analysis cannot be performed because the pattern table has an insufficient amount of historic user interaction data to perform the biometric authentication. In a second outcome, the result indicates that the passive biometric analysis identified the user 202 as a previous user that entered a previous behavioral OTP. In a third outcome, the result indicates that the passive biometric analysis identified the user 202 as being different from a previous user that entered a previous behavioral OTP.

FIGS. 3-6 are tables illustrating example stages 300-600 of a pattern table that is built by the system of FIG. 1, in accordance with various aspects of the present disclosure. Specifically, at operation 212, in response to being unable to consult a historic pattern table that is associated with the user 202, the server 100 starts the process of building a pattern table that is associated with the user 202 by generating a behavioral OTP. As a working example, the server 100 may generate a behavioral OTP as "673." In some examples, this behavioral OTP is entirely random. In other examples, this behavioral OTP is semi-random.

At operation 214, the server 100 sends the behavioral OTP to the user 202 with a request that the user 202 enter the behavioral OTP into the application 126 via an electronic communication. At operation 218, as the user 202 enters the behavioral OTP, the application 126 monitors and observes the behavioral OTP submission by the user 202 and stores the observations of the user 202 in the user interaction data repository 128. For example, the interaction data observed by the application 126 may be referred to as user interaction data #1 (UID1). At operation 220, after observing the OTP submission by the user 202, the application 126 forwards the OTP submission and the observations of the user 202 (i.e., UID1) to the server 100.

Figure 3:
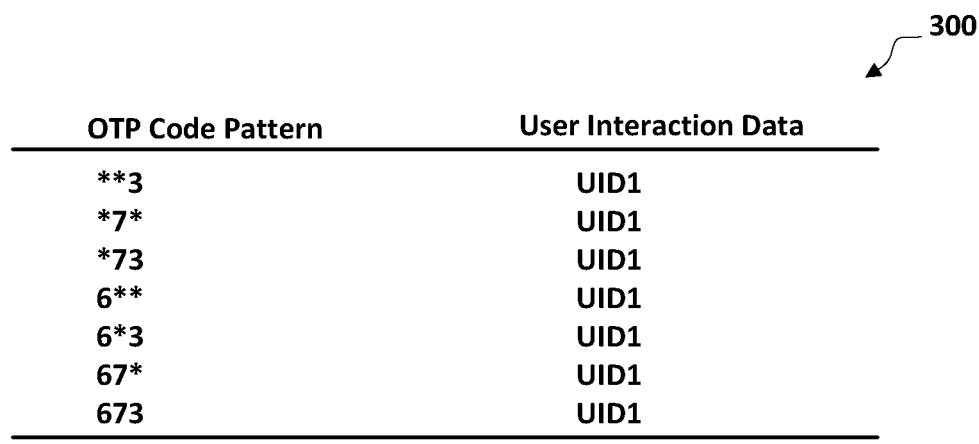

At operation 224, the server 100 stores the observations of the user 202 (i.e., UID1) in a pattern table of the user profile that is associated with the user 202. As illustrated in FIG. 3, the pattern table includes a first column "OTP Code Pattern," and a second column "User Interaction Data." In the first stage 300, the first column includes every permutation of the OTP "673." Specifically, the first column includes: \*\*3, \*7\*, \*73, 6\*\*, 6\*3, 67\*, and 673, where \* represents a wild card. Additionally, in the first stage 300, the second column includes the user interaction data UID associated with each permutation of the OTP "673" in the first column.

When the user 202 submits a second authentication request, operations 202-224 are repeated. However, at operation 212, the server 100 generates a second behavioral OTP based on the first stage 300 of the pattern table. For example, the server 100 generates a second behavioral OTP "679." The second behavioral OTP is semi-random because the server 100 selects "6" and "7" from the previous OTP of "673." At operation 214, the server 100 sends the second behavioral OTP to the user 202 with a request that the user 202 enter the second behavioral OTP into the application 126 via an electronic communication.

At operation 218, as the user 202 enters the second behavioral OTP, the application 126 monitors and observes the second behavioral OTP submission by the user 202 and stores the observations of the user 202 in the user interaction data repository 128. For example, the interaction data observed by the application 126 may be referred to as user interaction data #2 (UID2). At operation 220, after observing the OTP submission by the user 202, the application 126 forwards the OTP submission and the observations of the user 202 (i.e., UID2) to the server 100.

Figure 4:
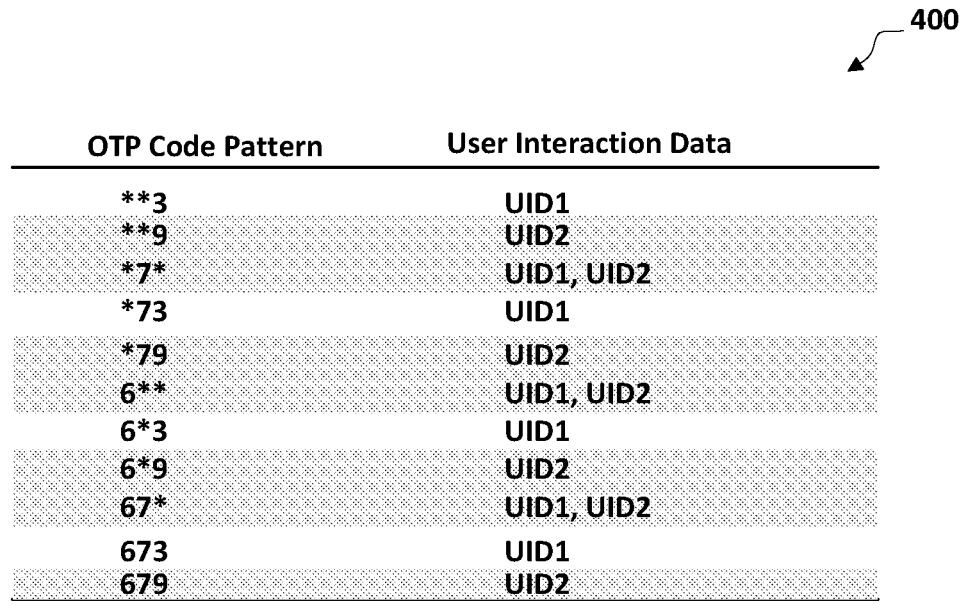

At operation 224, the server 100 stores the observations of the user 202 in the pattern table of the user profile that is associated with the user 202. As illustrated in FIG. 4, in the second stage 400, the first column includes every permutation of the OTP "673" and "679." Specifically, the first column includes: \*\*3, \*\*9, \*7\*, \*73, \*79, 6\*\*, 6\*3, 6\*9, 67\*, 673, and 679, where \* represents a wild card. Additionally, in the second stage 400, the second column includes the user interaction data UID1 associated with each permutation of the OTP "673" in the first column and the user interaction data UID2 associated with each permutation of the OTP "679" in the first column.

When the user 202 submits a third authentication request, operations 202-224 are repeated. However, at operation 212, the server 100 generates a third behavioral OTP based on the second stage 400 of the pattern table. For example, the server 100 generates a third behavioral OTP "279." The third behavioral OTP is semi-random because the server 100 selects "7" and "9" from the second OTP of "679." At operation 214, the server 100 sends the third behavioral OTP to the user 202 with a request that the user 202 enter the third behavioral OTP into the application 126 via an electronic communication.

At operation 218, as the user 202 enters the third behavioral OTP, the application 126 monitors and observes the third behavioral OTP submission by the user 202 and stores the observations of the user 202 in the user interaction data repository 128. For example, the interaction data observed by the application 126 may be referred to as user interaction data #3 (UID3). At operation 220, after observing the OTP submission by the user 202, the application 126 forwards the OTP submission and the observations of the user 202 (i.e., UID3) to the server 100.

At operation 224, the server 100 stores the observations of the user 202 in the pattern table of the user profile that is associated with the user 202. As illustrated in FIG. 5, in the third stage 500, the first column includes every permutation of the OTP "673," "679," and "279." Specifically, the first column includes: \*\*3, \*\*9, \*7\*, \*73, \*79, 2\*\*, 2\*9, 27\*, 279, 6\*\*, 6\*3, 6\*9, 67\*, 673, and 679, where \* represents a wild card. Additionally, in the third stage 500, the second column includes the user interaction data UID1 associated with each permutation of the OTP "673" in the first column, the user interaction data UID2 associated with each permutation of the OTP "679" in the first column, and the user interaction data UID3 associated with each permutation of the OTP "279" in the first column.

When the user 202 submits a fourth authentication request, operations 202-212 are repeated. However, at operation 212, the server 100 has sufficient data for a passive biometric match when the behavioral OTP "*7*" is used. For example, the server 100 generates a fourth behavioral OTP "273." The fourth behavioral OTP is semi-random because the server 100 selects "7" from the previous OTPs of "673," "679," and "279." At operation 214, the server 100 sends the fourth behavioral OTP to the user 202 with a request that the user 202 enter the fourth behavioral OTP into the application 126 via an electronic communication.

At operation 218, as the user 202 enters the fourth behavioral OTP, the application 126 monitors and observes the fourth behavioral OTP submission by the user 202 and stores the observations of the user 202 in the user interaction data repository 128. For example, the interaction data observed by the application 126 may be referred to as user interaction data #4 (UID4). At operation 220, after observing the OTP submission by the user 202, the application 126 forwards the OTP submission and the observations of the user 202 (i.e., UID4) to the server 100.

Figure 6:
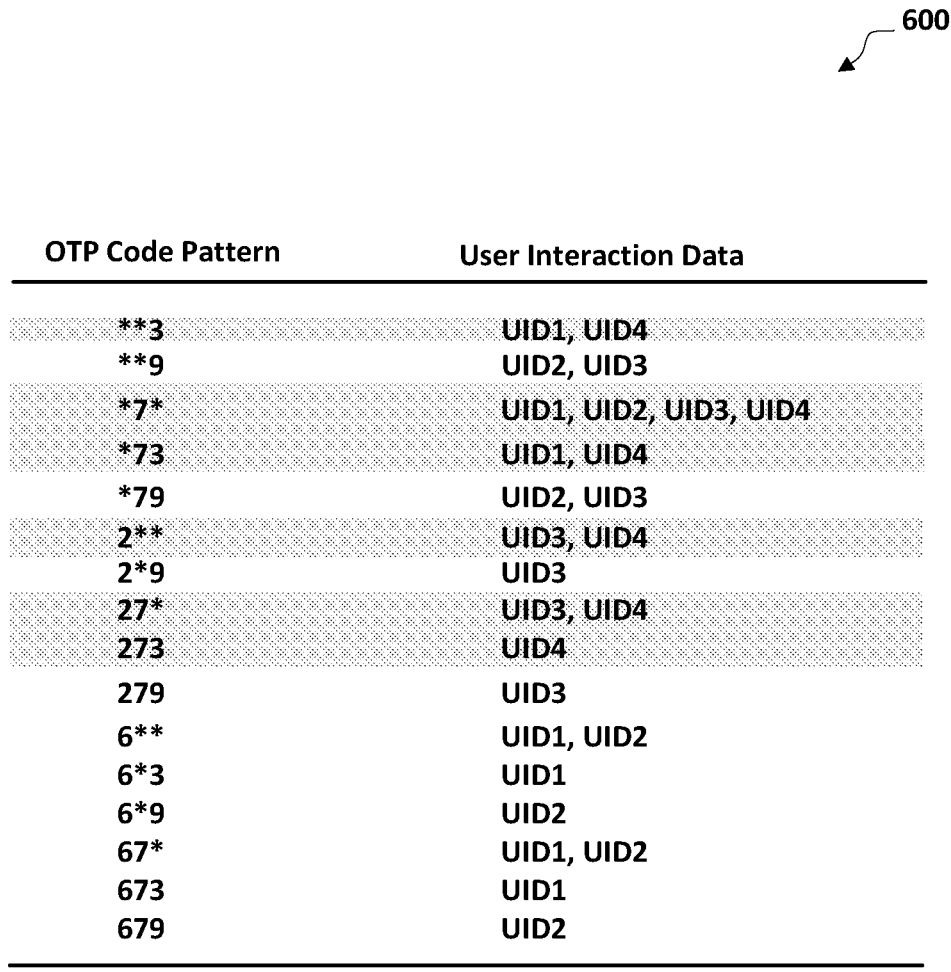

At operation 224, the server 100 stores the observations of the user 202 in the pattern table of the user profile that is associated with the user 202. As illustrated in FIG. 6, in the fourth stage 600, the first column includes every permutation of the OTP "673," "679," and "279." Specifically, the first column includes: 3, 9, *7*, *73, *79, 2**, 2*9, 27*, 279, 6**, 6*3, 6*9, 67*, 673, and 679, where * represents a wild card. Additionally, in the fourth stage 600, the second column includes the user interaction data UID1 associated with each permutation of the OTP "673" in the first column, the user interaction data UID2 associated with each permutation of the OTP "679" in the first column, the user interaction data UID3 associated with each permutation of the OTP "279" in the first column, and the user interaction data UID4 associated with each permutation of the OTP "273" in the first column.

At operation 228, the server 100 then performs a passive biometric analysis of the user 202 based on the pattern table and by leveraging historic user interaction data from OTP patterns matching the fourth behavioral OTP, i.e., the "273" pattern. Specifically, the known patterns (i.e., known behavioral trends) between the different user interaction data (i.e., UID1, UID2, UID3, and UID4) and associated with **3, *7*, *73, 2**, 27*, and 273 are enough data to confirm a passive biometric match after performing a passive biometric analysis. The passive biometric match confirms that the user 202 that entered the fourth behavioral OTP is the same as the user that entered the first, second, and third behavioral OTPs.

Figure 7:
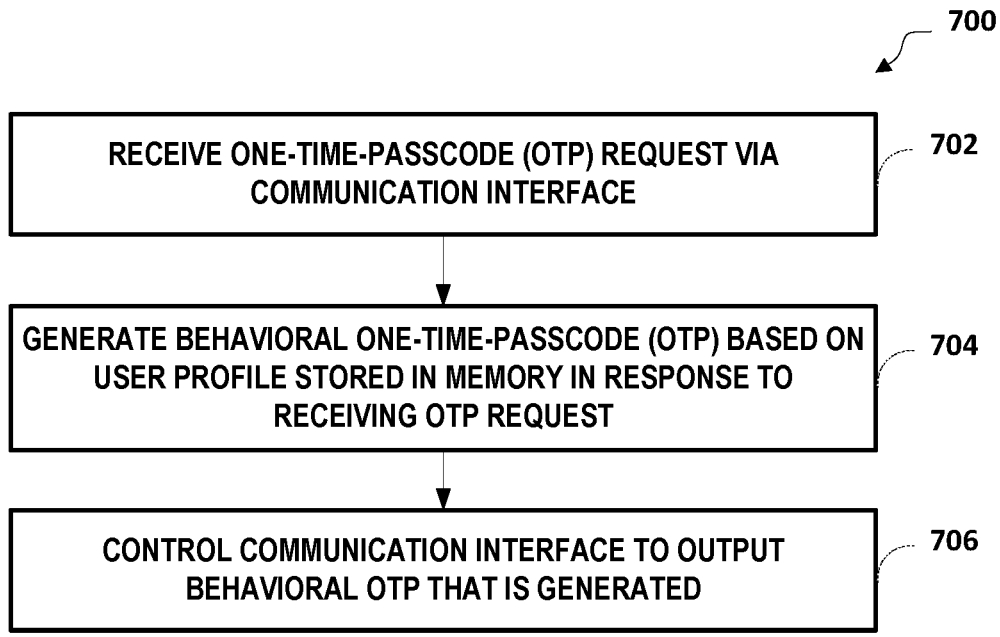
FIG. 7 is a flowchart illustrating a first example method performed by the system of FIG. 1, in accordance with various aspects of the present disclosure.

FIG. 7 is a flowchart illustrating a first example method 700 performed by the system 10 of FIG. 1, in accordance with various aspects of the present disclosure. In the example of FIG. 7, the method 700 includes the electronic processor receiving a one-time-passcode (OTP) request via a communication interface (at block 702). For example, the electronic processor 102 receives a one-time-passcode (OTP) request via the communication interface 112.

The method 700 includes generating, with the electronic processor, a behavioral one-time-passcode (OTP) based on a user profile stored in a memory in response to receiving the OTP request (at block 704). For example, the electronic processor 102 generates a behavioral OTP based on a user profile stored in the memory 104 in response to receiving the OTP request.

In some examples, generating the behavioral one-time-passcode (OTP) based on the user profile stored in the memory in response to receiving the OTP request may further include generating the behavioral one-time-passcode (OTP) based on a pattern table that is included in the user profile stored in the memory, and the behavioral OTP includes two or more non-random characters. In other examples, generating the behavioral one-time-passcode (OTP) based on the user profile stored in the memory in response to receiving the OTP request may further include generating the behavioral one-time-passcode (OTP) based on a lack of a pattern table in the user profile stored in the memory, and the behavioral OTP includes two or more random characters.

The method 700 includes controlling, with the electronic processor, the communication interface to output the behavioral OTP that is generated (at block 706). For example, the electronic processor 102 controls the communication interface 112 to output the behavioral OTP that is generated.

Figure 8:
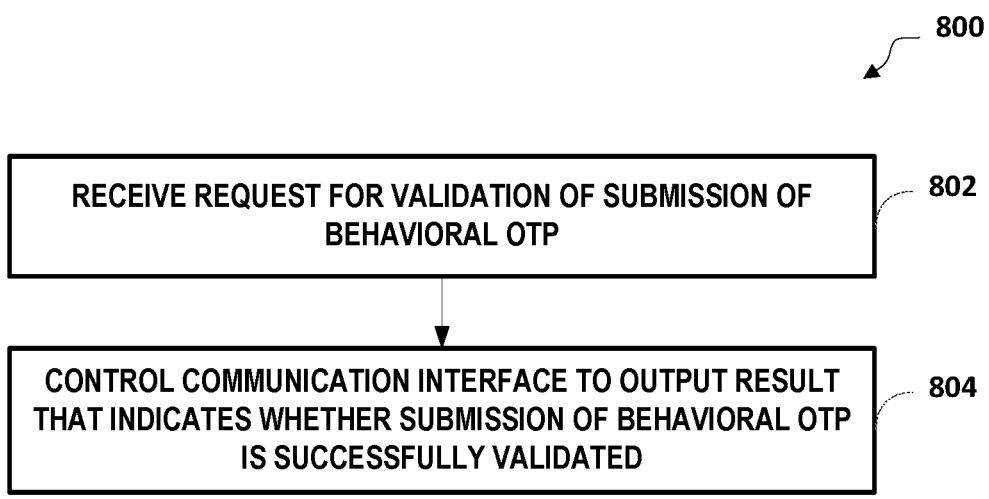
FIG. 8 is a flowchart illustrating a second example method performed by the system of FIG. 1, in accordance with various aspects of the present disclosure.

FIG. 8 is a flowchart illustrating a second example method 800 performed by the system 10 of FIG. 1, in accordance with various aspects of the present disclosure. FIG. 8 is an extension of the method 700 illustrated in FIG. 7.

In the example of FIG. 8, the method 800 includes receiving, with the electronic processor, a request for validation of a submission of the behavioral OTP (at block 802). For example, the electronic processor 102 receives a request for validation of a submission of the behavioral OTP via the communication interface 112.

In the example of FIG. 8, the method 800 also includes controlling, with the electronic processor, the communication interface to output a result that indicates whether the submission of the behavioral OTP is successfully validated (at block 804). For example, the electronic processor 102 controls the communication interface 112 to output a result that indicates whether the submission of the behavioral OTP is successfully validated.

Figure 9:
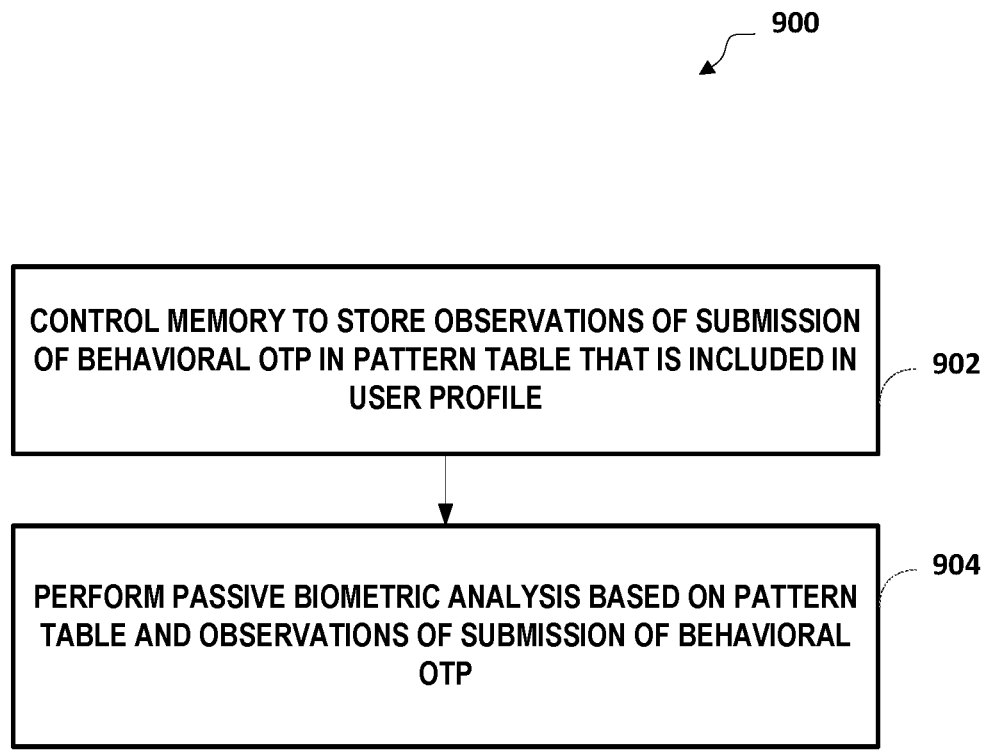
FIG. 9 is a flowchart illustrating a third example method performed by the system of FIG. 1, in accordance with various aspects of the present disclosure.

FIG. 9 is a flowchart illustrating a third example method 900 performed by the system 10 of FIG. 1, in accordance with various aspects of the present disclosure. FIG. 9 is an extension of the method 700 illustrated in FIG. 7 and/or the method 800 illustrated in FIG. 8.

In the example of FIG. 9, the method 900 includes controlling, with the electronic processor, the memory to store observations of the submission of the behavioral OTP in a pattern table that is included in the user profile (at block 902). For example, the electronic processor 102 controls the memory 104 observations of the submission of the behavioral OTP in a pattern table that is included in the user profile.

In the example of FIG. 9, the method 900 includes performing, with the electronic processor, a passive biometric analysis based on the pattern table and the observations of the submission of the behavioral OTP (at block 904). For example, the electronic processor 102 performs a passive biometric analysis based on the pattern table and the observations of the submission of the behavioral OTP stored in the memory 104. In some examples, the result as described above in FIG. 7 also indicates whether a user that submitted the behavioral OTP at the entry screen of the application 126 is identified as being the same as a previously-observed user associated with the user profile based on the passive biometric analysis.

Thus, the present disclosure provides, among other things, behavioral one-time-passcode (OTP) generation. Various features and advantages of the invention are set forth in the following claims.

What is claimed is:

1. A server comprising:
   a memory including a behavioral one-time-passcode (OTP) program and a user profile repository; and
   an electronic processor communicatively connected to the memory, the electronic processor, when executing the behavioral OTP program, is configured to:
   receive a one-time-passcode (OTP) request,
   generate a behavioral one-time-passcode (OTP) based on a user profile stored in the user profile repository in response to receiving the OTP request,
   output the behavioral OTP that is generated,
   receive a request for validation of a submission of the behavioral OTP,
   output a result that indicates whether the submission of the behavioral OTP is successfully validated,
   store observations of the submission of the behavioral OTP in a pattern table that is included in the user profile, and
   perform a passive behavioral analysis based on the pattern table and the observations of the submission of the behavioral OTP,
   wherein the result also indicates whether a user that submitted the behavioral OTP is the same as a previously-observed user associated with the user profile.

2. The server of claim 1, wherein, when executing the behavioral OTP program, the electronic processor is further configured to receive the observations of the submission of the behavioral OTP.

3. The server of claim 1, wherein, to generate the behavioral one-time-passcode (OTP) based on the user profile stored in the user profile repository in response to receiving the OTP request, the electronic processor is further configured to generate the behavioral one-time-passcode (OTP) based on a lack of the pattern table in the user profile stored in the user profile repository, wherein the behavioral OTP includes two or more random characters.

4. A server comprising:
   a memory including a behavioral one-time-passcode (OTP) program and a user profile repository; and
   an electronic processor communicatively connected to the memory, the electronic processor, when executing the behavioral OTP program, is configured to:
   receive a one-time-passcode (OTP) request,
   generate a behavioral one-time-passcode (OTP) based on a user profile stored in the user profile repository in response to receiving the OTP request, and
   output the behavioral OTP that is generated,
   wherein, to generate the behavioral one-time-passcode (OTP) based on the user profile stored in the user profile repository in response to receiving the OTP request, the electronic processor is further configured to generate the behavioral one-time-passcode (OTP) based on a pattern table that is included in the user profile stored in the user profile repository, and wherein the behavioral OTP includes two or more non-random characters.

5. The server of claim 4, wherein the behavioral OTP further includes one or more random characters.

6. A system comprising:
   a network;
   an interface device; and
   a server including
   a memory including a behavioral one-time-passcode (OTP) program and a user profile repository; and
   an electronic processor communicatively connected to the memory, the electronic processor, when executing the behavioral OTP program, is configured to:
   receive a one-time-passcode (OTP) request from the interface device via the network,
   generate a behavioral one-time-passcode (OTP) based on a user profile stored in the user profile repository in response to receiving the OTP request,
   output the behavioral OTP that is generated to the interface device via the network,
   receive a request for validation of a submission of the behavioral OTP from the interface device,
   output a result that indicates whether the submission of the behavioral OTP is successfully validated to the interface device,
   store observations of the submission of the behavioral OTP in a pattern table that is included in the user profile, and
   perform a passive behavioral analysis based on the pattern table and the observations of the submission of the behavioral OTP,
   wherein the result also indicates whether a user that submitted the behavioral OTP is the same as a previously-observed user associated with the user profile.

7. The system of claim 6, wherein, when executing the behavioral OTP program, the electronic processor is further configured to receive the observations of the submission of the behavioral OTP from the interface device.

8. The system of claim 6, wherein, to generate the behavioral one-time-passcode (OTP) based on the user profile stored in the user profile repository in response to receiving the OTP request, the electronic processor is further configured to generate the behavioral one-time-passcode (OTP) based on a lack of the pattern table in the user profile stored in the user profile repository, wherein the behavioral OTP includes two or more random characters.

9. A system comprising:
   a network;
   an interface device; and
   a server including
   a memory including a behavioral one-time-passcode (OTP) program and a user profile repository; and
   an electronic processor communicatively connected to the memory, the electronic processor, when executing the behavioral OTP program, is configured to:
   receive a one-time-passcode (OTP) request from the interface device via the network,
   generate a behavioral one-time-passcode (OTP) based on a user profile stored in the user profile repository in response to receiving the OTP request,
   wherein the interface device includes a second electronic processor and a second memory storing an application, wherein, when executing the application, the second electronic processor is configured to:
   transmit the OTP request,
   receive the behavioral OTP from the server, control a display screen to display the behavioral OTP to a user in response to receiving the behavioral OTP from the server, receive a submission of the behavioral OTP from the user, observe the submission of the behavioral OTP from the user, request a validation of the submission of the behavioral OTP from the server, and output observations of the submission of the behavioral OTP to the server.

10. A system comprising:
a network;
an interface device; and
a server including
a memory including a behavioral one-time-passcode (OTP) program and a user profile repository; and
an electronic processor communicatively connected to the memory, the electronic processor, when executing the behavioral OTP program, is configured to:
receive a one-time-passcode (OTP) request from the interface device via the network,
generate a behavioral one-time-passcode (OTP) based on a user profile stored in the user profile repository in response to receiving the OTP request, and
output the behavioral OTP that is generated to the interface device via the network,
wherein, to generate the behavioral one-time-passcode (OTP) based on the user profile stored in the user profile repository in response to receiving the OTP request, the electronic processor is further configured to generate the behavioral one-time-passcode (OTP) based on a pattern table that is included in the user profile stored in the user profile repository, and wherein the behavioral OTP includes two or more non-random characters.

11. The system of claim 10, wherein the behavioral OTP further includes one or more random characters.

12. A method comprising:
receiving, with an electronic processor, a one-time-passcode (OTP) request via a communication interface;
generating, with the electronic processor, a behavioral one-time-passcode (OTP) based on a user profile stored in a memory in response to receiving the OTP request; and
controlling, with the electronic processor, the communication interface to output the behavioral OTP that is generated;
receiving, with the electronic processor, a request for validation of a submission of the behavioral OTP;
controlling, with the electronic processor, the communication interface to output a result that indicates whether the submission of the behavioral OTP is successfully validated;
controlling, with the electronic processor, the memory to store observations of the submission of the behavioral OTP in a pattern table that is included in the user profile; and
performing, with the electronic processor, a passive behavioral analysis based on the pattern table and the observations of the submission of the behavioral OTP,
wherein the result also indicates whether a user that submitted the behavioral OTP is the same as a previously-observed user associated with the user profile.

13. The method of claim 12, wherein generating the behavioral one-time-passcode (OTP) based on the user profile stored in the memory in response to receiving the OTP request further includes generating the behavioral one-time-passcode (OTP) based on a lack of the pattern table in the user profile stored in the memory, wherein the behavioral OTP includes two or more random characters.

14. A method comprising:
receiving, with an electronic processor, a one-time-passcode (OTP) request via a communication interface;
generating, with the electronic processor, a behavioral one-time-passcode (OTP) based on a user profile stored in a memory in response to receiving the OTP request; and
controlling, with the electronic processor, the communication interface to output the behavioral OTP that is generated,
wherein generating the behavioral one-time-passcode (OTP) based on the user profile stored in the memory in response to receiving the OTP request further includes generating the behavioral one-time-passcode (OTP) based on a pattern table that is included in the user profile stored in the memory, and wherein the behavioral OTP includes two or more non-random characters.

* * * * *